(12) United States Patent
Heczko

(10) Patent No.: US 6,517,878 B2
(45) Date of Patent: Feb. 11, 2003

(54) BEVERAGE PREPARATION SYSTEM

(76) Inventor: James Heczko, 3512 Manhatten Ave., Manhatten Beach, CA (US) 90266

( * ) Notice: Subject to any disclaimer, the term of this patent is extended or adjusted under 35 U.S.C. 154(b) by 0 days.

(21) Appl. No.: 09/811,878

(22) Filed: Mar. 19, 2001

(65) Prior Publication Data

US 2002/0020302 A1 Feb. 21, 2002

Related U.S. Application Data

(63) Continuation-in-part of application No. 09/639,969, filed on Aug. 16, 2000.

(51) Int. Cl.[7] ............................................. B65D 25/08
(52) U.S. Cl. ..................... 426/112; 426/115; 426/117; 426/519; 206/219; 206/221; 220/495.03
(58) Field of Search ..................... 99/295, 302 R, 99/302 C, 302 FB, 303, 317; 426/77–80, 112, 115, 117, 394, 402, 411, 519; 220/495.03, 495.06; 206/219, 221

(56) References Cited

U.S. PATENT DOCUMENTS

| | | |
|---|---|---|
| 1,136,776 A | 4/1915 | Collins |
| 1,224,778 A | 5/1917 | Palm |
| 1,504,500 A | 8/1924 | Pizzoglio |
| 1,632,342 A | 6/1927 | Lambert |
| 2,455,660 A | 12/1948 | Dunlop |
| 2,550,034 A | 4/1951 | Allen |
| 2,876,113 A | 3/1959 | Barton |
| 2,885,104 A * | 5/1959 | Greenspan ..................... 215/6 |
| 3,052,371 A * | 9/1962 | Van Bemmelen ............ 220/20 |
| 3,119,694 A | 1/1964 | Gauld |
| 3,270,659 A | 9/1966 | Tavera |
| 3,487,989 A | 1/1970 | Rausing et al. |
| 3,527,153 A | 9/1970 | Orlando |
| 3,602,386 A | 8/1971 | Brime et al. |
| 3,784,039 A | 1/1974 | Marco |
| 4,116,354 A * | 9/1978 | Kenkare et al. ............... 220/20 |
| 4,227,362 A | 10/1980 | Wallsten |
| 4,487,114 A | 12/1984 | Abdenour |
| 4,509,641 A * | 4/1985 | Scieri et al. ................. 206/219 |
| 4,627,986 A * | 12/1986 | Bardsley et al. ............. 426/112 |
| 4,803,088 A | 2/1989 | Yamamoto et al. |
| 4,805,799 A | 2/1989 | Robbins, III |

(List continued on next page.)

Primary Examiner—Keith Hendricks
Assistant Examiner—Drew Becker
(74) Attorney, Agent, or Firm—Stetina Brunda Garred & Brucker (57) ABSTRACT

A cartridge for a compressible bottle containing a liquid. The cartridge comprises a housing attachable to the bottle and a collapsible bag. The housing and the bag together form an interior which contains a concentrate such as a drink mix. A transfer mechanism is provided whereby the liquid is pumped from the bottle into the cartridge by repeatedly compressing the bottle. As liquid is transferred into the cartridge, the bag expands within the bottle. In the preferred embodiment, the transfer mechanism is provided as part of the cartridge and the cartridge may be sized to fit a standard water bottle. In an alternate embodiment, the transfer mechanism is provided as part of a special bottle.

23 Claims, 4 Drawing Sheets

U.S. PATENT DOCUMENTS

| | | |
|---|---|---|
| 4,869,912 A | 9/1989 | McCoy et al. |
| 4,883,935 A | 11/1989 | Fairchild et al. |
| 4,895,264 A | 1/1990 | Phlaphongphanich |
| 4,908,222 A | 3/1990 | Yu |
| 4,981,588 A | 1/1991 | Poulallion |
| 5,072,661 A | 12/1991 | Kondo |
| 5,079,396 A | 1/1992 | Katz et al. |
| 5,104,666 A | 4/1992 | Sanvitale |
| 5,132,124 A | 7/1992 | Tamaki et al. |
| 5,178,294 A | 1/1993 | Hill et al. |
| 5,300,308 A | 4/1994 | Louridas |
| 5,309,823 A | 5/1994 | Allen |
| 5,368,183 A | 11/1994 | Singer |
| 5,385,251 A | 1/1995 | Dunn |
| 5,424,083 A | 6/1995 | Lozito |
| 5,636,871 A | 6/1997 | Field |
| 5,738,786 A | 4/1998 | Winnington-Ingram |
| 5,806,408 A * | 9/1998 | DeBacker et al. ............ 99/295 |
| 5,840,189 A | 11/1998 | Sylvan et al. |
| 5,913,964 A | 6/1999 | Melton |
| 5,948,455 A | 9/1999 | Schaeffer et al. |
| 5,984,141 A * | 11/1999 | Gibler ........................ 222/80 |
| 6,022,134 A * | 2/2000 | Andrews .................... 366/130 |
| 6,079,871 A * | 6/2000 | Jonas et al. ................. 366/336 |
| 6,089,389 A * | 7/2000 | Sharon et al. ............. 215/11.1 |
| 6,165,523 A * | 12/2000 | Story ........................ 426/112 |
| 6,263,923 B1 * | 7/2001 | Castillo ..................... 141/100 |

\* cited by examiner

BEVERAGE PREPARATION SYSTEM

CROSS-REFERENCE TO RELATED APPLICATIONS

This Application is a continuation-in-part patent application of U.S. patent application Ser. No. 09/639,969 filed Aug. 16, 2000, and now in the issuance process.

STATEMENT RE: FEDERALLY SPONSORED RESEARCH/DEVELOPMENT (Not Applicable)

BACKGROUND OF THE INVENTION

The present invention generally relates to the preparation of liquid products, and more particularly to a system for the preparation of liquid mixtures from a concentrate.

Many liquid products are prepared by the addition of a liquid to a concentrate. Food products prepared in this manner include baby food, fruit juices, sports drinks and nutritional supplements. Non-food products include pesticides, pharmaceuticals and construction materials. In such cases, the liquid is typically water, though it may be a variety of other substances (e.g. milk or hydrocarbon). The concentrate may be a powder, granulate, paste or concentrated liquid.

Concentrates offer many benefits. These include compactness, light weight, and extended shelf life. Many packages have been developed to contain such concentrates including cans, cartons and packets. Such packages are often offered in a variety of sizes ranging from bulk containers to single-serve and other pre-dosed measures.

Despite the diversity of packaging formats, most existing packages for concentrates demonstrate several disadvantages. In most existing packages, the concentrate must be transferred to a separate mixing container prior to the addition of liquid. In transferring the concentrate, the consumer risks spilling it. For non-hazardous materials, spilling is a nuisance; for hazardous materials spilling may be dangerous. In addition to the concentrate being transferred, the liquid must be measured (usually using a separate container) and added to the concentrate. Thus when using existing packages, one or more vessels are dirtied and must be discarded or cleaned.

The present invention addresses the above-mentioned deficiencies in concentrated mix packages by providing a system which includes a premeasured dose of a concentrate contained in an expandable package. Specifically, the present invention provides a cartridge that is filled with a concentrate and is insertable into a bottle of water or other liquid. The invention provides a means of pumping the water from the bottle into the cartridge. As water is pumped into the cartridge, the cartridge expands into the bottle whereby the contents of the cartridge is mixed with the liquid in the bottle to produce a liquid mixture. In this respect, the present invention provides a system whereby a liquid mixture can be made from a concentrate quickly and easily.

BRIEF SUMMARY OF THE INVENTION

A cartridge for a compressible bottle containing a liquid is disclosed. The cartridge comprises a housing that is attachable to the bottle and a collapsible bag that is attached to the housing. The housing and bag form an interior that contains a quantity of concentrate. Disposed within the housing and in fluid communication with the liquid contained within the bottle will be an input port. Additionally, the housing will include an output port in fluid communication with the exterior thereof. A transfer mechanism is disposed between the input port and the bottle that is operative to pump water from the bottle through the input port. The transfer mechanism is activated by compression of the bottle and, accordingly, compression of the bottle will force liquid from the interior of the bottle into the interior of the housing and hence the bag. The liquid will combine with the concentrate contained within the housing to make the desired liquid.

It is contemplated that the concentrate may be a food item such as baby formula, sports drink, or juice mix. Accordingly, the output port may be a nipple, nozzle or other closure appropriate for the type of mix contained within the cartridge. In order for the bag to expand, the bag will be fabricated from a plastic material. It will be recognized that the liquid contained within the bottle typically will be water; however, other types of fluid may be used.

In a first embodiment, the cartridge is generally cylindrical such that it is insertable into a neck of the bottle. In this respect, the cartridge will be sized to fit standard commercially available water bottles and may be fabricated from a plastic material such that the same is disposable. Additionally, the cartridge includes a transfer mechanism which is operative to transfer water from the bottle into the cartridge.

In a second embodiment, a generally cylindrical cartridge is sized to fit into a specialized bottle. The specialized bottle contains a transfer mechanism which transfers water from the bottle into the cartridge.

In accordance with the present invention, there is additionally provided a liquid preparation system. The liquid preparation system comprises a compressible bottle with a hollow interior and a cartridge insertable thereinto. The cartridge is comprised of a housing and a collapsible bag attached to the housing. Disposed within the housing and the collapsible bag is a concentrate, such as a powdered drink mix. An input port is disposed within the housing and in fluid communication with the liquid contained within the bottle and the interior of the housing. The housing will further include an output port in fluid communication with the exterior of the housing. A transfer mechanism is provided such that compression of the bottle forces liquid contained therein into the interior of the housing and the bag such that the liquid will combine with the powdered drink mix.

In accordance with the present invention, there is further provided a method of forming a mixture with the beverage preparation system. The method comprises compressing the bottle to thereby force the liquid contained therein into the cartridge of the beverage preparation system. The liquid forced into the cartridge will mix with concentrate contained therein in order to produce the desired mixture.

BRIEF DESCRIPTION OF THE DRAWINGS

These as well as other features of the present invention will become more apparent upon reference to the drawings wherein.

DETAILED DESCRIPTION OF THE INVENTION

Figure 1:
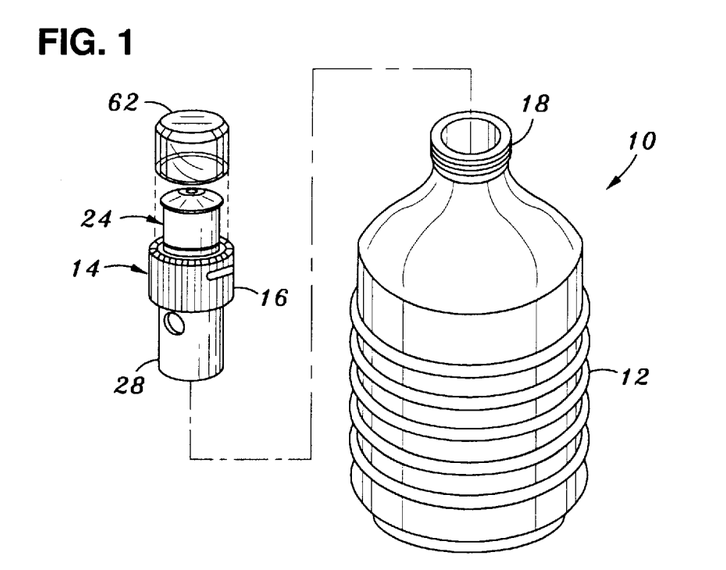
FIG. 1 perspectively illustrates a first embodiment of a beverage preparation system constructed in accordance with the present invention.
Figure 7:
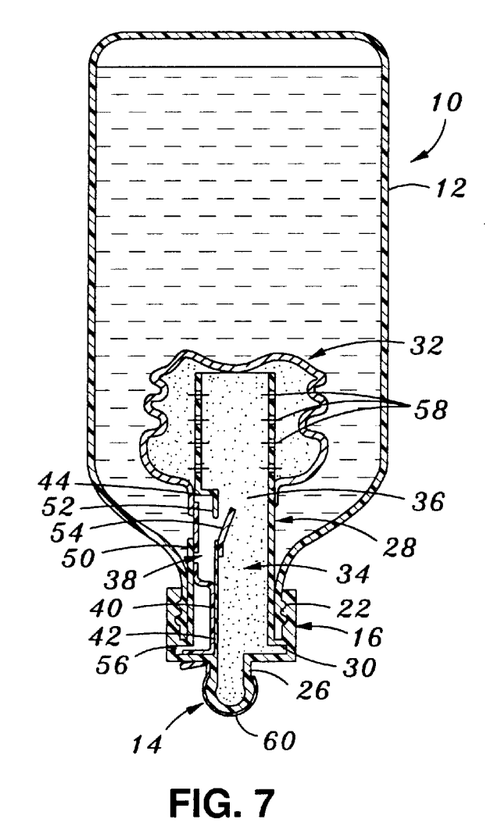
FIG. 7 is a cross-sectional view of an alternative embodiment of the beverage preparation system in FIG. 1.
Figure 8:
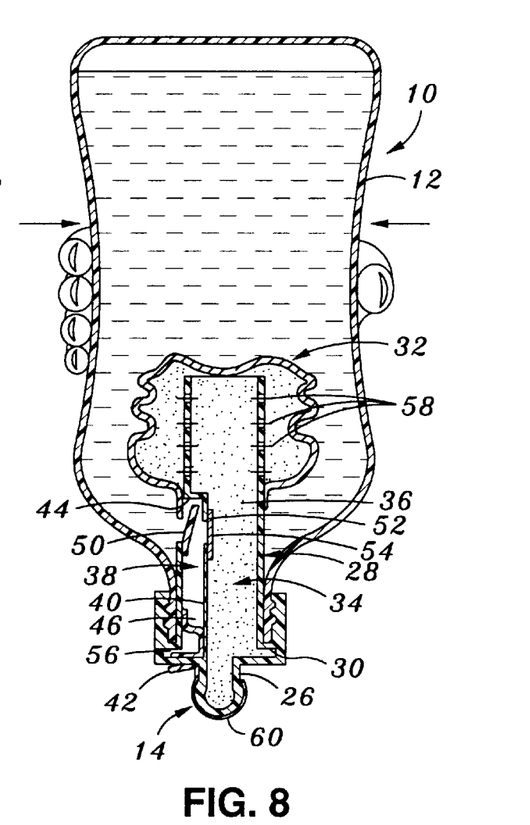
FIG. 8 is a cross-sectional view of the beverage preparation shown in FIG. 7 in a compressed state.

Referring now to the drawings wherein the showings are for purposes of illustrating a preferred embodiment of the present invention only, and not for purposes of limiting the same, FIG. 1 perspectively illustrates a beverage preparation system 10 constructed in accordance with a first embodiment of the present invention. The beverage preparation system 10 comprises a compressible bottle 12 and a cartridge 14 insertable therein. Specifically, the cartridge 14 contains a powdered drink mix (i.e., concentrate) which will be mixed with water contained within the bottle 12. In this respect, a user of the beverage preparation system 10 will insert the cartridge 14 into the bottle 12. The bottle 12 may be a conventional plastic water bottle or a customized bottle, as will be explained below. As seen in FIG. 1, the cartridge 14 includes a cylindrical threaded portion 16 which is engageable to the neck 18 of bottle 12. Specifically, as seen in FIGS. 7 and 8, the threaded portion 16 includes interior threads 20 engageable to neck threads 22. In this respect, the threaded portion 16 is sized and configured to be threaded on standard necks of water bottles.

As seen in FIG. 1, the cartridge 14 includes a push-pull top 24 which when pulled upwardly allows fluid to flow from the bottle 12. By pushing downwardly on the push-pull top 24, the fluid contained within bottle 12 will be sealed therein. Alternatively, the cartridge 14 may include a nipple 26 instead of push-pull top 24, as seen in FIGS. 7 and 8 and explained below.

Referring to FIGS. 7 and 8, the cartridge 14 includes a body portion 28 integrally formed with the threaded portion 16. The body portion 28 extends from the threaded portion 16 and is sized to be insertable within the neck 18 of the bottle 12. The attachment between the threaded portion 16 and the bottom portion 28 forms a flange 30 which engages the top surface of the neck 18 when the cartridge 14 is threaded onto the bottle 12. In this respect, the flange 30 will seal the cartridge 14 to the bottle 12.

Attached to the bottom portion 28 of the cartridge 14 is a bag 32. The bag 32 is fabricated from a pliable plastic material such that it may be folded. As seen in FIGS. 7 and 8, the bag is attached to a lower portion of the body portion 28. In the preferred embodiment, the bag 32 will be in a folded configuration when inserting the cartridge 14 into the bottle 12 and will expand as water is transferred into the interior of the cartridge. Bag 32 may be sized larger than the interior of bottle 12, thus allowing the bag to conform with the interior of the bottle when fully expanded. Alternately, Bag 32 may be sized smaller than the interior of the bottle and only partially fill the bottle when fully expanded.

The cartridge 14 includes an interior chamber 34. Specifically, the chamber 34 is defined by the cylindrical body portion 28 and the bag 32. Disposed within the chamber 34 is a prescribed quantity of concentrate 36. The concentrate 36 may be a powder that will flavor the water contained within the bottle 12 when mixed therewith. Accordingly, the concentrate 36 may create a sports drink, juice, tea or baby formula. In the preferred embodiment, the amount of concentrate 36 needed to make the drink, will be contained within the chamber 34. The concentrate 36 will be mixed with the water in bottle 12 in the bag 32. Accordingly, the folded bag 32 will expand with the water from the bottle 12 and the concentrate 36.

In order to transfer water into the bag 32, the cartridge 14 further includes a transfer mechanism 38. The transfer mechanism 38 is operative to allow water from the bottle 12 to enter the bag 32 from pressure applied to the exterior thereof. Accordingly, the transfer mechanism 38 comprises an inner wall 40 disposed in substantially parallel relation to the body portion 28 and positioned within the chamber 34 of cartridge 14. Furthermore, the transfer chamber 38 includes a diaphragm 42 and an end wall 44 disposed within the chamber 34 of cartridge 14. Specifically, the end wall 44 is attached to both the interior of the body portion 28 and the inner wall 40. Similarly, the diaphragm 42 is attached to the inner side of the body portion 28 and the inner wall 40. In this respect, the inner wall 40, diaphragm 42 and end wall 44 of transfer mechanism 38 define a neutral chamber 46 which is disposed within chamber 34 of cartridge 14. The diaphragm 42 is typically fabricated from a flexible rubber type material such that the interior space of neutral chamber 46 may vary. Specifically, the neutral chamber 46 shown in FIG. 7 has less volume than the neutral chamber 46 shown in FIG. 8 because the diaphragm 42 has expanded into the interior thereof.

Furthermore, the transfer mechanism 38 includes an intake port 48 disposed on the body portion 28. In fluid communication with the intake port 48 is a first check valve 50. In the preferred embodiment, the first check valve 50 will allow fluid to only enter the neutral chamber 46. The first check valve 50 may be fabricated from a pliable material and is typically formed such that it is normally biased in a closed position, as shown in FIG. 7. Similarly, the transfer mechanism 38 further includes an output port 52 formed in inner wall 40. In fluid communication with the output port 52 is a second check valve 54 attached to inner wall 40. The second check valve 54 is fabricated from a flexible material and normally biased in a closed position, as shown in FIG. 8. The second check valve 54 is operative allow fluid contained within neutral chamber 46 to exit therefrom into chamber. In addition to the foregoing, the transfer mechanism 38 further includes a vent opening 56 formed within the threaded portion 16 of cartridge 14. As seen in FIGS. 7 and 8, the vent opening 56 allows the diaphragm 42 to vary the volume of neutral chamber 46 by allowing air behind the diaphragm 42 to ingress or egress through vent opening 56.

In order to make the liquid mix, the user will insert cartridge 14 within the bottle 12 filled with water. The cartridge 14 will be threaded upon neck 18 such that the water within the bottle 12 will be sealed therein. Next, the bottle 12 will be inverted so that the cartridge 14 is pointing downwardly and the water within the bottle 12 will flow near neck 18 and cartridge 14. In order to force the water within bag 32, the user will squeeze the bottle 12 thereby increasing the pressure of the water inside, as seen in FIG. 8. By squeezing the bottle 12, the water inside will enter neutral chamber 46 through intake port 48 and first check valve 50. Specifically, the increase in pressure within the bottle 12 from squeezing will force first check valve 50 open such that water will flow into neutral chamber 48. As previously mentioned, diaphragm 42 is pliable such that the volume of neutral chamber 46 will increase from the addition of water therein. Vent opening 56 allows the diaphragm 42 to move thereby expanding the volume of the neutral chamber 46.

When pressure on the outside of bottle 12 is released (i.e., the bottle 12 is not squeezed), elastic tension in the bottle 12 causes the bottle 12 to return to a relaxed state as show in FIG. 7. As the bottle 12 returns to the relaxed state, the first check valve 50 will close and second check valve 54 will open from the transfer of water from the neutral chamber 46 into the bag 32. Specifically, as the bottle 12 transitions to the relaxed state, the bag 32 will expand due to the transfer of water within the bottle 12. The bag 32 will expand in order to maintain a constant volume of water within the bottle 12. As the bag 32 is expanding, the second check valve 54 will open thereby allowing water within neutral chamber 46 to be siphoned within bag 32. As the water within neutral chamber 46 is being siphoned into bag 32, diaphragm 42 will contract to thereby decrease the volume within neutral chamber 46. By squeezing the bottle 12 consecutively, a pumping action is formed whereby water within the bottle 12 will be transferred into the bag 32 thereby causing the bag 32 to expand. As the water is transferred into the bag 32, the water will mix with the concentrate 36 contained therein to form the desired liquid preparation. When the bag 32 is fully expanded, the resistance in squeezing the bottle 12 will increase such that the user will know to stop.

The concentrate 36 will be mixed with the water by shaking the bottle 12. The body portion 28 of the cartridge 14 may include cut outs 58 which will function as a whisk as the bottle 12 is being shaken. Accordingly, the cut outs 58 facilitate mixing of the water with the concentrate 36. Once the concentrate 36 is fully mixed with the water, the drink is ready to be consumed. As shown in FIGS. 7 and 8, the cartridge 14 includes nipple 26. Disposed about nipple 26 is a sealing sheet 60 which protects the nipple 26 from contaminates. Accordingly, prior to consumption, the sealing sheet 60 will be removed from the nipple 56. Alternatively, as previously mentioned, the cartridge 14 may include push-pull top 24 or other closure (not shown). In order to protect push-pull top 24 from contaminants a cap 62 may be disposed thereover as shown in FIG. 1. The cap 62 will be removed from the push-pull top 24 before consumption of the drink.

Figure 2A:
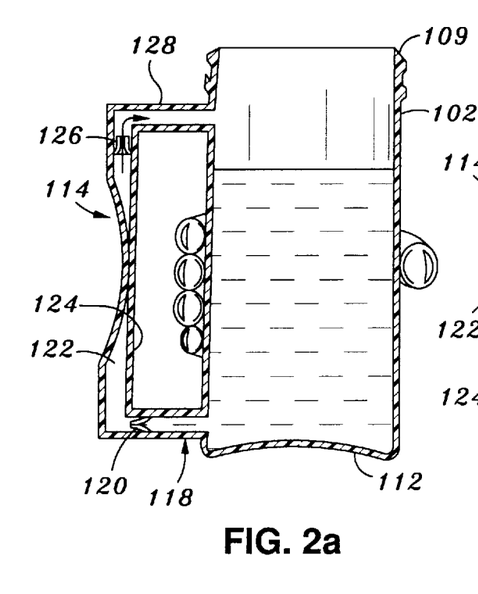
FIGS. 2a–2b are cross-sectional views of a bottle which can be used as part of a beverage preparation system according to a second embodiment of the present invention.
Figure 2B:
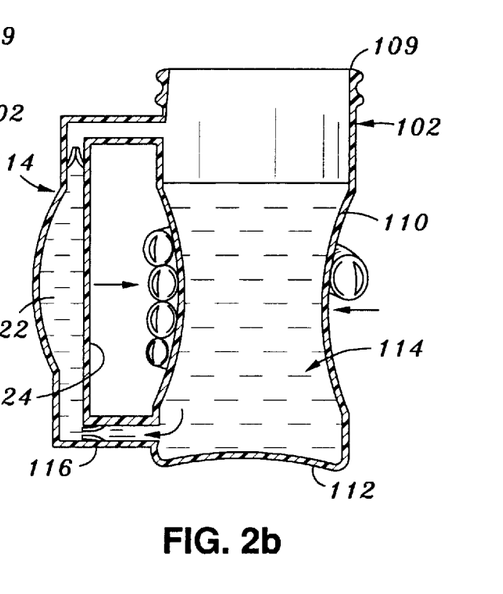
Figure 3:
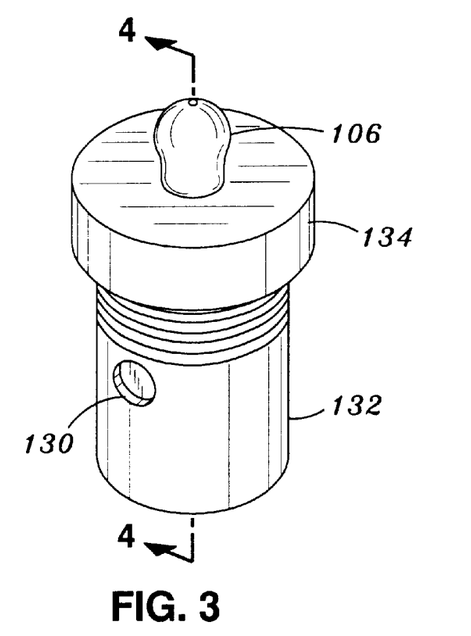
FIG. 3 is a perspective view of a cartridge for use with the beverage preparation system shown in FIG. 2.
Figure 4:
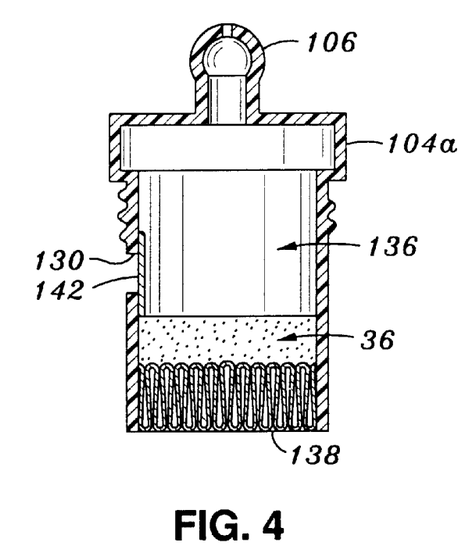
FIG. 4 is a cross-sectional view of the cartridge shown in FIG. 3 taken along line 4—4.
Figure 5:
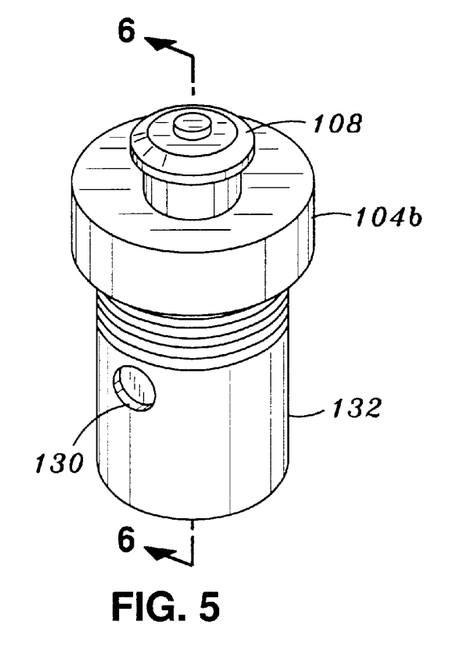
FIG. 5 is a perspective view of a second embodiment of a cartridge used with the beverage preparation system shown in FIG. 2.
Figure 6:
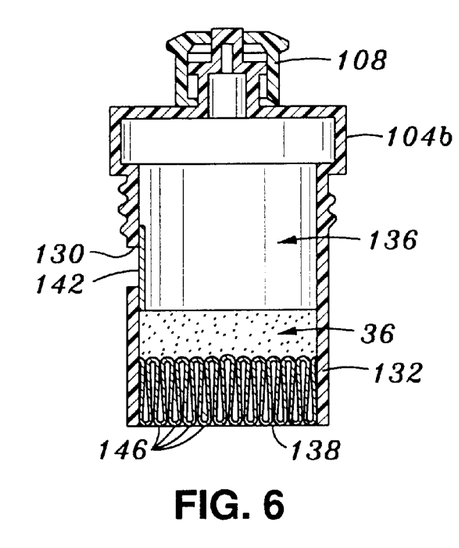
FIG. 6 is a cross-sectional view of the cartridge shown in FIG. 5 and taken along line 6—6.

An alternative embodiment of the preparation system 10 is shown in FIGS. 2–6. Referring to FIGS. 2a and 2b, the alternative embodiment of the beverage preparation system 10 will include a pressure vessel 102 and a cartridge 104a or 104b as shown in FIGS. 4–6. Specifically, either cartridge 104a or cartridge 104b is insertable into the pressure vessel 102. The following description will be in regard to cartridge 104a. However, it will be recognized by those of ordinary skill in the art, that cartridge 104b is similar to cartridge 104a but that cartridge 104a includes a nipple 106 instead of a push-pull top 108. Both the nipple 106 and push-pull top 108 are configured similarly to the push-pull top 24 and nipple 26 previously described. Also, it will be recognized that although depicted as nipple 106 and push-pull top 108, countless other outlet mechanisms may be formed upon the cartridges 104, such as peelable lids or twist-off tops, for example. The cartridge 104a is threadably attached to an opening or neck 109 of pressure vessel 102. In this regard, the cartridge 104a will seal with the pressure vessel 102 thereby forming a water tight container.

The pressure vessel 102 is formed from a collapsible plastic material with a sidewall 110 that may be squeezed by the user. Typically, the sidewall 110 is formed from a plastic material and formed into a cylindrical shape. It will be recognized that the shape of the pressure vessel 102 can be varied depending on the preference of the user. The sidewall 110 is integrally attached to a bottom 112. The sidewall 110 and bottom 112 thereby define an interior chamber 114.

Attached to the sidewall 110 is a channel 116 defining a handle thereby. The channel 116 is formed with an intake tube 118 which is in fluid communication with the interior chamber 114. The intake tube 118 is typically a hollow tube which fluid can flow therethrough. Disposed within the intake tube 118 is a intake valve 120. The intake valve 120 will only allow fluid to flow from the interior chamber 114 into the intake tube 118.

In fluid communication with the intake tube 118 and intake valve 120 is a reservoir 122. In the preferred embodiment, the reservoir 122 is expandable from a relaxed state shown in FIG. 2a to an expanded state shown in FIG. 2b. As will be further explained, as the pressure vessel 102 is squeezed, the reservoir 122 will expand to the size shown in FIG. 2b. Accordingly, the volume of the reservoir 122 is variable. As seen in FIGS. 2a and 2b, the reservoir 122 is disposed along a handle portion 124 of handle 116. Disposed on an upper part (i.e., near the top of pressure vessel 102) of the handle portion 124 is a discharge valve 126. The discharge valve 126 is operative to allow fluid to exit the reservoir 122 when the pressure vessel 102 is in the relaxed state shown in FIG. 2a. In fluid communication with discharge valve is discharge tube 128. The discharge tube 128 is in fluid communication with the interior chamber 114 of the pressure vessel 102 near the top thereof. Accordingly, fluid contained within reservoir 122 will drain therefrom via discharge tube 128.

The pressure vessel 102 is operative to transfer water from the bottom portion thereof into the top portion. In this respect, as the pressure vessel 102 is squeezed as shown in FIG. 2b, the fluid within interior chamber 114 will be transferred to reservoir 122 thereby expanding the same. Discharge valve 126 is configured such that it will not open as the user squeezes the sidewall 110. Accordingly, the reservoir 122 will expand to the configuration shown in FIG. 2b. As the user relaxes his or her grip on the sidewall 110 of pressure vessel 102, the sidewall 110 will resume the relaxed state shown in FIG. 2a. Additionally, the reservoir 122 will compress to the state shown in FIG. 2a. Specifically, the volume of reservoir 122 will decrease thereby forcing the fluid contained therein through discharge tube 128. The fluid will flow through discharge valve 126 and out discharge tube 128. Intake valve 120 prevents the fluid within reservoir 122 from flowing back into intake tube 118. By consecutively squeezing and relaxing the sidewall 110 of pressure vessel 102, a pumping action may be achieved whereby fluid within interior chamber 114 will be transferred through reservoir 122 to discharge tube 128.

As previously mentioned, the pressure vessel 102 is configured to be used with either cartridge 104a or 104b. The following description will be for cartridge 140a, however it will be recognized that the only difference between cartridge 104a and 104b is the fact that nipple 106 is used instead of a push-pull top 108. Cartridge 104a is configured to be threaded onto opening or neck 109 of pressure vessel 102. As the cartridge 104a is threaded on the neck 109, an input opening 130 is aligned with discharge tube 128. Specifically, discharge tube 128 will be in fluid communication with input opening 130 such that fluid from the reservoir 122 will be directed into input opening 130.

The input opening 130 is formed on a body portion 132 of the cartridge 104a. The body portion 132 extends from an upper portion 134 of the cartridge 104a. In the preferred embodiment, the body portion 132 is generally cylindrical such that it can be inserted within the neck 109 of the pressure vessel 102. The body portion 132 defines concentrate chamber 136. The concentrate chamber 136 is a hollow compartment within which concentrate 36 is contained. The concentrate 36 is mixed with the water in the pressure vessel 102 to make the flavored drink.

Attached to body portion 132 and disposed within concentration chamber 136 is a bag 138 fabricated from a plastic-type material such that it may be folded and compressed within the concentrate chamber 136. As seen in FIGS. 4 and 6, the bag 138 is attached to an inner surface of the body portion 132. The bag 138 comprises a series of folds 140 which allow the bag to expand from the concentrate chamber 136.

Attached to the interior of body portion 132 is a cartridge valve 142. Specifically, the cartridge valve 142 is positioned adjacent to input opening 130 such that the valve 142 is operable to allow fluid to enter concentrate chamber 136 only. In this respect, the cartridge valve 142 may be a flap valve which is attached to a portion of the interior of body portion 132 such that the pressure of fluid exiting discharge tube 128 will open cartridge valve 142 and permit fluid to enter concentrate chamber 136.

In order to use the pressure vessel 102 and cartridge 104a, the user will insert the cartridge 104a in the neck 109. Next, the user will compress the side wall 110 of pressure vessel 102 as previously described to transfer water to discharge tube 128. As previously mentioned discharge tube 128 is in fluid communication with input opening 130 such that water will be transferred into concentrate chamber 136. As the water is transferred into concentrate chamber 136, it will mix with concentrate 36 and expand the bag 138. Specifically, the folds 140 of bag 138 will come out such that the bag will open and expand within the interior chamber 114 of pressure vessel 102. Because the liquid within interior chamber 114 of pressure vessel 102 is being transferred into the concentrate chamber 136 and bag 138, the bag 138 will occupy the same volume of the fluid being transferred. In this respect, the liquid within interior chamber 114 will be transferred into the bag 138 and mixed with concentrate 36 to thereby form the desired drink.

As mentioned above, cartridge 104a has a nipple 106 which will be used to drink from. Accordingly, cartridge 104a will typically be used with a powdered baby formula as the concentrate 36. On the other hand, cartridge 104b uses a push-pull top 108 in order to drink from pressure vessel 102. Therefore, the concentrate 36 for cartridge 104b will typically be a sports drink or powdered juice mix.

Figure 9:
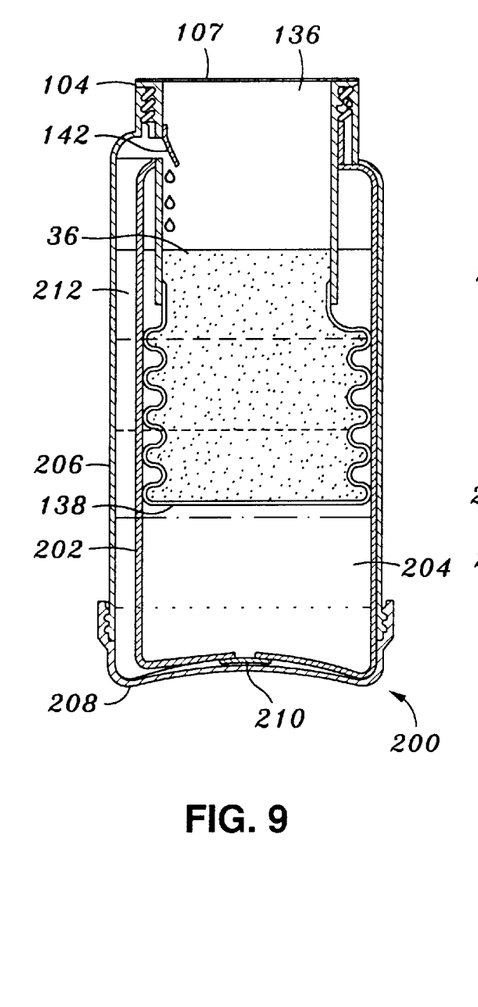
FIG. 9 is a cross-sectional view of an alternative embodiment of a bottle which can be used as part of a beverage preparation system according to the present invention.
Figure 10:
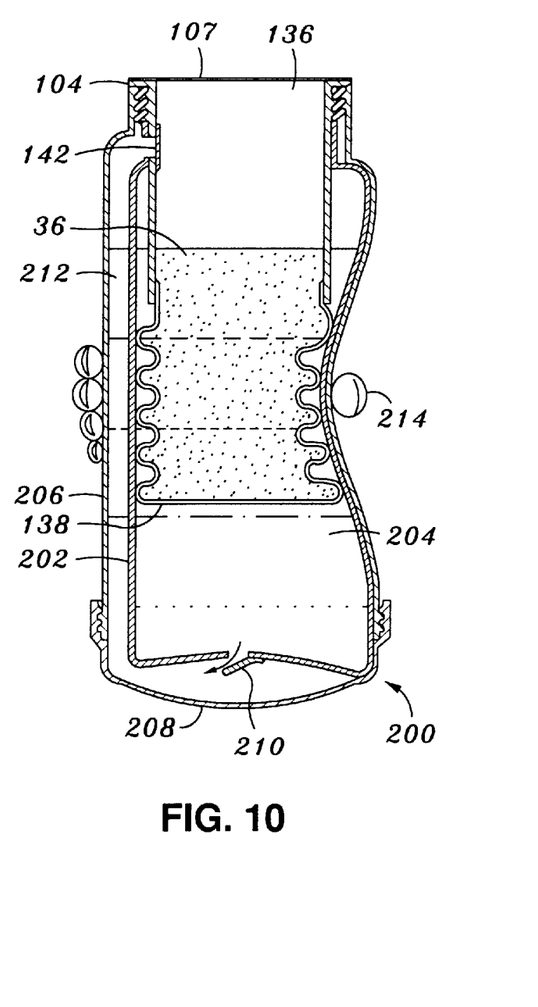
FIG. 10 is a cross-sectional view of the bottle depicted in FIG. 9 wherein the bottle is shown being manually compressed.

In an alternative configuration of the pressure vessel 102 depicted in FIGS. 2a–b, there is depicted in FIGS. 9 and 10 a pressure vessel 200 for use with a cartridge 104, which may take any of the aforementioned variety discussed above with respect to cartridges 104a and 104b. In this respect, cartridge 104, as depicted in FIGS. 9 and 10, will be axially insertable within and threadably engagable with the vessel 200, and will likewise be provided with chamber 136 with bag 138 affixed thereto, within which will be disposed concentrate 36. Cartridge 104 will further preferably include cartridge valve 142 operative to selectively receive a fluid therethrough, as shown. Such cartridge 104 will further include any of the outlet mechanisms discussed above, such as nipple 106 or push-pull top 108. As shown, such outlet may include the simple sealing sheet 107, which may be selectively removed to gain access to chamber 136. It will be recognized, however, that any of a variety of access mechanisms may be provided as part of such cartridge.

As to the vessel 200, the same is preferably comprised of the combination of a first inner bottle 202 axially disposed within outer bottle 206. Preferably, such bottle members are threadably engaged to one another as shown. To facilitate the ability of such bottle members to interconnect with one another, an annular base plate 208 may be provided that is threadably engagable with outer bottle member 206 to form the structure as shown.

As illustrated in FIG. 9, when so interconnected, inner bottle member 202 defines a chamber 204 within which a quantity of liquid may be stored. Once the interconnected bottle members are squeezed, as illustrated in FIG. 10, liquid stored within chamber 204 is operative to flow therefrom via suction flap or valve 210 in the direction indicated. Preferably, base plate 208 will be formed from an elastic material to thus receive the liquid as shown, and thus to form the reservoir similar to the embodiment depicted in FIGS. 2a–b. Such fluid received therein may thereafter be operatively transferred via channel 212 formed between inner and outer bottle members 202, 206 to thus ultimately be delivered into chamber 13 via discharge valve 142, in the manner previously described.

Advantageously, such multi-component construction of the vessel 200 facilitates cleaning of the apparatus, as well as provides a more durable configuration once assembled. It should be recognized, however, that the vessel 200 may be formed from more or less structural components than depicted without departing from the scope of the present invention. It should further be recognized that unidirectional pathway defined by valve 210, channel 212, and valve 142 may be arranged in a variety of configurations, and may only comprise a single valve formed as part of inner bottle 202, outer bottle 206 or upon cartridge 104, as shown. Accordingly, all foreseeable modifications and structure are contemplated within the scope of the invention.

Additional modifications and improvements of the present invention may also be apparent to those of ordinary skill in the art. As a particular example, the channel 116 defined by the handle of the bottle depicted in FIGS. 2a–b may be formed anywhere upon the vessel 102 and need not necessarily be formed as part of such handle with interior chamber 114 with intake valve 120, reservoir 122 and discharge valve 126 operatively formed anywhere thereon. Thus, the particular combination of parts described and illustrated herein is intended to represent only a certain embodiment of the present invention, and is not intended to serve as a limitation of alternative devices within the spirit and scope of the invention. Along these lines, it should be expressly recognized that although discussed at length herein for applications regarding the preparation of beverages and the like, the systems and methods of the present invention may find wide spread application. For example, it is contemplated that the systems and methods of the present invention can be utilized for any purpose where it is desired to quickly and easily prepare a mixture of any sort, and can include but is not limited to, the mixture of chemicals or the dilution of concentrates. Representative of such applications include, but is by no means limited to, the preparation of pesticides, paints and detergents.

What is claimed is:

1. A cartridge for a compressible bottle containing a liquid, the cartridge comprising:
   a housing attachable to the bottle, the housing having a hollow interior;
   a collapsible bag attached to the housing;
   an input port disposed within the housing and in fluid communication with the liquid contained within the bottle and the interior of the housing; and
   an output port in fluid communication with the interior of the housing;
   wherein compression of the bottle forces liquid within the bottle into the interior of the housing and the bag.

2. The cartridge of claim 1 further comprising a concentrate substantially disposed within the hollow interior of the housing, the concentrate being operative to combine with the liquid forced within the interior to form a desired mixture.

3. The cartridge of claim 2 wherein the concentrate is baby formula.

4. The cartridge of claim 2 wherein the concentrate is a sports drink.

5. The cartridge of claim 2 wherein the powdered drink mix is a powdered juice mix.

6. The cartridge of claim 1 wherein the output port is a nozzle.

7. The cartridge of claim 1 wherein the output port is a nipple.

8. The cartridge of claim 1 wherein the bag is fabricated from a plastic material.

9. The cartridge of claim 1 wherein the liquid is water.

10. The cartridge of claim 1 wherein housing is configured to be insertable through a neck of the bottle.

11. The cartridge of claim 10 wherein the housing is generally cylindrical.

12. The cartridge of claim 1 further comprising an input valve in fluid communication with the input port in order to prevent fluid from flowing out of the input port.

13. The cartridge of claim 10 wherein the housing is fabricated from a plastic material.

14. The cartridge of claim 1 further comprising a concentrate, said concentrate being disposed within both the hollow interior of the housing and the collapsible bag, the concentrate being operative to combine with the liquid forced within the interior to form a desired mixture.

15. The cartridge of claim 1 further comprising a concentrate, said concentrate being substantially disposed within the collapsible bag, the concentrate being operative to combine with the liquid forced within the interior to form a desired mixture.

16. A beverage preparation system comprising:
    a compressible bottle operative to hold a liquid;
    a housing insertable into the bottle and having a hollow interior;
    a collapsible bag attached to the housing;
    an input port disposed within the housing and in fluid communication with the liquid contained within the bottle and the interior of the housing;
    an output port in fluid communication with the interior of the housing; and
    a concentrated drink mix disposed within the collapsible bag;
    wherein compression of the bottle forces liquid within the bottle into the interior of the housing and the bag such that the liquid will combine with the concentrated drink mix to form an admixture, said admixture being accessible via said output port.

17. The beverage preparation system of claim 16 wherein the bottle comprises a channel portion operative to transfer liquid from the interior of the bottle into the interior of the housing.

18. The beverage preparation system of claim 17 wherein the channel comprises at least one valve and a reservoir operative to transfer the liquid from the bottle into the interior of the housing.

19. The beverage preparation system of claim 18 wherein the reservoir is expandable in order to facilitate the transfer of the liquid.

20. The beverage preparation system of claim 17 wherein said channel is formed as hollow handle.

21. The beverage preparation system of claim 16 wherein said compressible bottle comprises the operative combination of a first inner bottle and a second outer bottle, said interconnected inner and outer bottles being operative to hold said liquid and, when collectively compressed forced the liquid into the interior of the housing.

22. The beverage preparation system of claim 21 wherein said inner bottle is axially disposed within and in fluid communication with said outer bottle such that in use, said inner bottle is operative to hold said liquid and when said inner and outer bottles are compressed, said liquid is forced from said inner bottle, through said outer bottle and into the interior of the housing.

23. The beverage preparation system of claim 18 wherein the channel comprises an intake valve, a reservoir, and a discharge valve operative to transfer the liquid from the bottle into the interior of the housing.

* * * * *